US010296425B2

(12) United States Patent
Huang et al.

(10) Patent No.: US 10,296,425 B2
(45) Date of Patent: May 21, 2019

(54) OPTIMIZING DATA PROCESSING ACROSS SERVER CLUSTERS AND DATA CENTERS USING CHECKPOINT-BASED DATA REPLICATION

(71) Applicant: Bank of America Corporation, Charlotte, NC (US)

(72) Inventors: Tao Huang, Bellevue, WA (US); Archie Agrawal, Seattle, WA (US); Sateesh Siripurapu, Bellevue, WA (US); Xianhong Zhang, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 218 days.

(21) Appl. No.: 15/492,122

(22) Filed: Apr. 20, 2017

(65) Prior Publication Data

US 2018/0307572 A1    Oct. 25, 2018

(51) Int. Cl.
  *G06F 11/00* (2006.01)
  *G06F 11/20* (2006.01)
  (Continued)

(52) U.S. Cl.
  CPC .......... *G06F 11/203* (2013.01); *G06F 9/4856* (2013.01); *G06F 16/27* (2019.01); *G06F 2201/84* (2013.01)

(58) Field of Classification Search
  CPC ............. G06F 11/1675; G06F 11/1679; G06F 11/1683
  (Continued)

(56) References Cited

U.S. PATENT DOCUMENTS 8,255,422 B2 *  8/2012  Corbea ................... G06F 9/505
                                                707/793
9,027,022 B2    5/2015  Huetter et al.
                (Continued)

OTHER PUBLICATIONS

"Apache Spark," from Wikipedia, the free encyclopedia, accessed Mar. 20, 2017, from https://en.wikipedia.org/wiki/Apache_Spark, 6 pages.

(Continued)

*Primary Examiner* — Sarai E Butler
(74) *Attorney, Agent, or Firm* — Banner & Witcoff, Ltd.; Michael A. Springs

(57) ABSTRACT

Aspects of the disclosure relate to optimizing data processing across server clusters and data centers using checkpoint-based data replication. A computing platform may determine to initiate a data processing job associated with identifying one or more features of a source dataset, and the data processing job may include multiple processing steps. Based on determining to initiate the data processing job, the computing platform may generate one or more commands directing one or more cluster server nodes associated with a data center to execute the multiple processing steps. The one or more commands may direct the one or more cluster server nodes to update a checkpoint table as each processing step is completed, and may further direct the one or more cluster server nodes to replicate processing results data to at least one other data center. Subsequently, the computing platform may send the generated commands to the cluster server nodes.

20 Claims, 9 Drawing Sheets

(51) Int. Cl.
*G06F 9/48* (2006.01)
*G06F 16/27* (2019.01)

(58) Field of Classification Search
USPC .................................................. 714/12, 13
See application file for complete search history.

(56) References Cited

U.S. PATENT DOCUMENTS

| | | | |
|---|---|---|---|
| 9,047,178 B2 | 6/2015 | Talagala et al. | |
| 9,047,216 B2 | 6/2015 | Soran et al. | |
| 9,052,933 B2 | 6/2015 | Astete et al. | |
| 9,063,763 B2 | 6/2015 | Astete et al. | |
| 9,075,858 B2 | 7/2015 | Andre et al. | |
| 9,081,501 B2 | 7/2015 | Asaad et al. | |
| 9,087,319 B2 | 7/2015 | Nguyen | |
| 9,101,279 B2 | 8/2015 | Ritchey et al. | |
| 9,122,698 B2 | 9/2015 | Lacapra et al. | |
| 9,158,540 B1 | 10/2015 | Tzelnic et al. | |
| 9,183,099 B2 | 11/2015 | Cota-Robles et al. | |
| 9,183,560 B2 | 11/2015 | Abelow | |
| 9,197,599 B1 | 11/2015 | Barry et al. | |
| 9,207,975 B2 | 12/2015 | Sirota et al. | |
| 9,213,719 B2 | 12/2015 | Lacapra et al. | |
| 9,213,720 B2 | 12/2015 | Lacapra et al. | |
| 9,215,329 B2 | 12/2015 | Kamboh et al. | |
| 9,218,278 B2 | 12/2015 | Talagala et al. | |
| 9,218,383 B2 | 12/2015 | Tan et al. | |
| 9,218,385 B2 | 12/2015 | Tan et al. | |
| 9,221,902 B2 | 12/2015 | Smider et al. | |
| 9,251,086 B2 | 2/2016 | Peterson et al. | |
| 9,256,460 B2 | 2/2016 | Jacobson et al. | |
| 9,262,205 B2 | 2/2016 | Jacobson et al. | |
| 9,280,591 B1 | 3/2016 | Kharatishvili et al. | |
| 9,286,261 B1 | 3/2016 | Tzelnic et al. | |
| 9,305,015 B2 | 4/2016 | Lacapra et al. | |
| 9,329,909 B1 | 5/2016 | Khanna et al. | |
| 9,367,663 B2 | 6/2016 | Deciu et al. | |
| 9,378,232 B2 | 6/2016 | Mukherjee et al. | |
| 9,394,529 B2 | 7/2016 | Barton et al. | |
| 9,396,206 B2 | 7/2016 | Lacapra et al. | |
| 9,401,835 B2 | 7/2016 | Jacobson et al. | |
| 9,417,754 B2 | 8/2016 | Smith | |
| 9,430,342 B1 | 8/2016 | Byan | |
| 9,430,390 B2 | 8/2016 | Mukherjee et al. | |
| 9,432,298 B1 | 8/2016 | Smith | |
| 9,434,966 B2 | 9/2016 | Picataggio et al. | |
| 9,436,390 B2 | 9/2016 | Soran et al. | |
| 9,436,589 B2 | 9/2016 | Li et al. | |
| 9,449,019 B2 | 9/2016 | Lacapra et al. | |
| 9,451,899 B2 | 9/2016 | Ritchey et al. | |
| 9,489,150 B2 | 11/2016 | Aszmann et al. | |
| 9,500,655 B2 | 11/2016 | Fantl et al. | |
| 9,507,843 B1 | 11/2016 | Madhavarapu et al. | |
| 9,512,382 B2 | 12/2016 | Dayton et al. | |
| 9,515,999 B2 | 12/2016 | Ylonen | |
| 9,519,664 B1 | 12/2016 | Kharatishvili et al. | |
| 9,547,560 B1* | 1/2017 | Lee | G06F 3/0619 |
| 9,575,874 B2 | 2/2017 | Gautallin et al. | |
| 2001/0008019 A1* | 7/2001 | Vert | G06F 11/1662 714/1 |
| 2010/0306687 A1* | 12/2010 | Deng | H04L 67/38 715/765 |
| 2013/0212136 A1* | 8/2013 | Nishida | G06F 17/3007 707/830 |
| 2016/0277509 A1 | 9/2016 | Qiang | |
| 2017/0085634 A1* | 3/2017 | Guney | H04L 67/1008 |
| 2017/0116302 A1* | 4/2017 | Czezatke | G06F 17/30581 |

OTHER PUBLICATIONS

"Apache Cassandra," from Wikipedia, the free encyclopedia, accessed Mar. 20, 2017, from https://en.wikipedia.org/wiki/Apache_Cassandra, 9 pages.

* cited by examiner

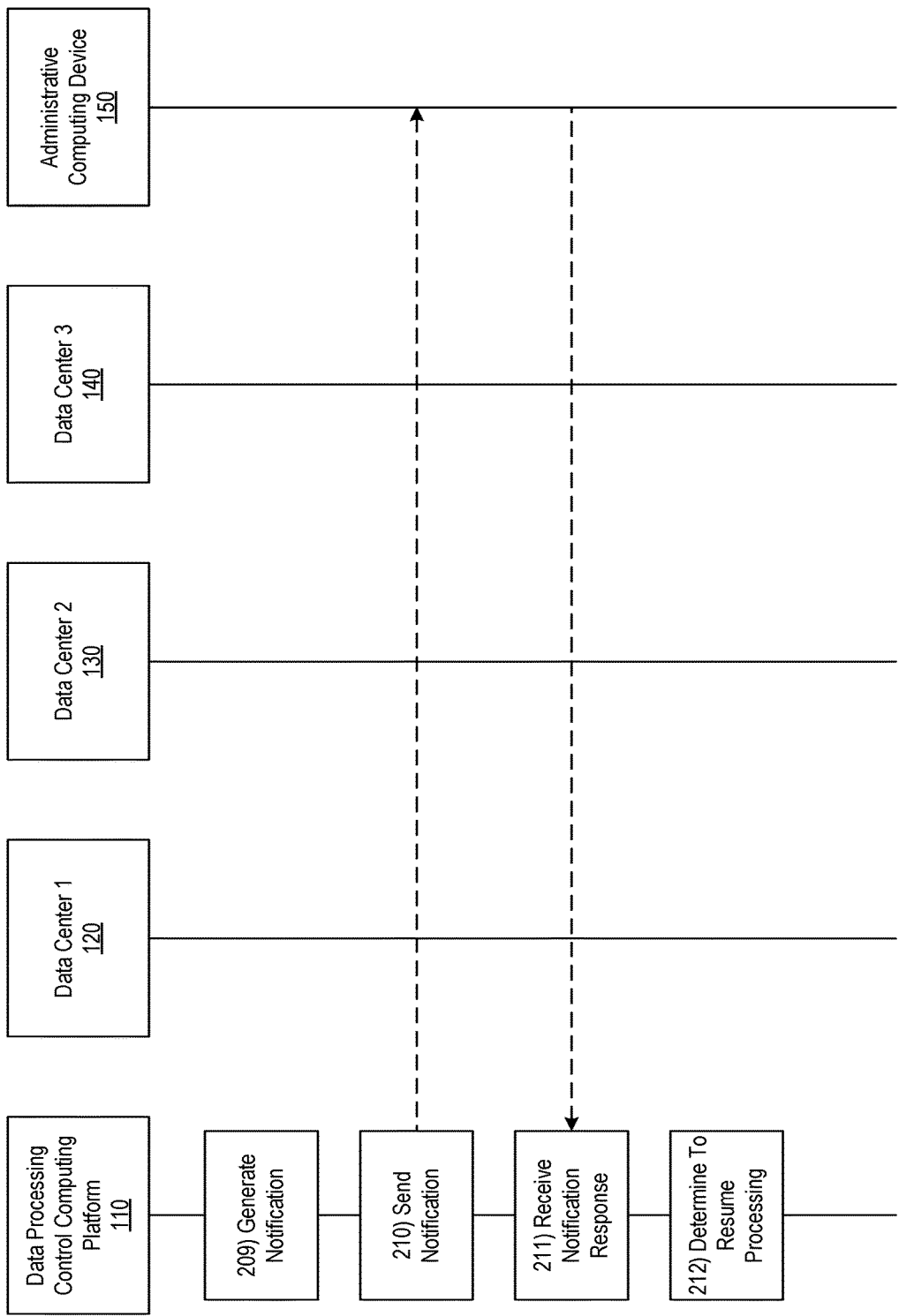

OPTIMIZING DATA PROCESSING ACROSS SERVER CLUSTERS AND DATA CENTERS USING CHECKPOINT-BASED DATA REPLICATION

BACKGROUND

Aspects of the disclosure relate to data processing, database synchronization, and replicating data across multiple databases and data centers to ensure consistency and coherence of distributed database records. In particular, one or more aspects of the disclosure relate to optimizing data processing across server clusters and data centers using checkpoint-based data replication.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with operating data centers that support client portals and other computing functions by optimizing data processing across server clusters and data centers using checkpoint-based data replication.

In accordance with one or more embodiments, a computing platform having at least one processor, a memory, and a communication interface may determine to initiate a data processing job associated with identifying one or more features of a source dataset, and the data processing job may include multiple processing steps. Based on determining to initiate the data processing job, the computing platform may generate one or more first commands directing one or more first cluster server nodes associated with a first data center to execute the multiple processing steps associated with the data processing job to identify the one or more features of the source dataset. The one or more first commands may further direct the one or more first cluster server nodes associated with the first data center to update a checkpoint table as each processing step of the multiple processing steps associated with the data processing job is completed. In addition, the one or more first commands may further direct the one or more first cluster server nodes associated with the first data center to replicate processing results data to at least one other data center different from the first data center as each processing step of the multiple processing steps associated with the data processing job is completed. Subsequently, the computing platform may send, via the communication interface, to the one or more first cluster server nodes associated with the first data center, the one or more first commands.

In some embodiments, determining to initiate the data processing job may include determining to initiate the data processing job based on receiving user input requesting to initiate the data processing job. In some embodiments, determining to initiate the data processing job may include determining to initiate the data processing job based on receiving, via the communication interface, from an administrative computing device, a script defining the data processing job.

In some embodiments, the processing results data may be determined by the one or more first cluster server nodes associated with the first data center during execution of each processing step of the multiple processing steps associated with the data processing job, and the processing results data may identify at least one feature of the source dataset as determined by the one or more first cluster server nodes associated with the first data center.

In some embodiments, the checkpoint table also may be replicated with the processing results data to the at least one other data center different from the first data center as each processing step of the multiple processing steps associated with the data processing job is completed, and the checkpoint table may indicate which processing steps of the multiple processing steps associated with the data processing job have been completed.

In some embodiments, the computing platform may detect a failure associated with the data processing job. In some embodiments, detecting the failure associated with the data processing job may include detecting that the data processing job has stopped prior to completion. In some embodiments, detecting the failure associated with the data processing job may include detecting that the first data center has failed.

In some embodiments, based on detecting the failure associated with the data processing job, the computing platform may generate a notification identifying the failure associated with the data processing job. Subsequently, the computing platform may send, via the communication interface, to an administrative computing device, the notification identifying the failure associated with the data processing job. In some embodiments, the computing platform may receive, via the communication interface, from the administrative computing device, a response to the notification identifying the failure associated with the data processing job.

In some embodiments, the computing platform may determine to resume execution of the data processing job at a second data center of the at least one other data center different from the first data center. In some embodiments, determining to resume execution of the data processing job at the second data center may include determining to resume the execution of the data processing job at the second data center based on one or more automatic failover criteria. In some embodiments, determining to resume execution of the data processing job at the second data center may include determining to resume the execution of the data processing job at the second data center based on a response to a notification identifying the failure associated with the data processing job received from an administrative computing device.

In some embodiments, based on determining to resume execution of the data processing job at the second data center, the computing platform may generate one or more second commands directing one or more second cluster server nodes associated with the second data center to execute at least one uncompleted processing step of the multiple processing steps associated with the data processing job based on the checkpoint table and the processing results data replicated from the first data center. Subsequently, the computing platform may send, via the communication interface, to the one or more second cluster server nodes associated with the second data center, the one or more second commands.

In some embodiments, the one or more second commands may further direct the one or more second cluster server nodes associated with the second data center to update the checkpoint table as each processing step of the multiple processing steps associated with the data processing job is completed. In addition, the one or more second commands may further direct the one or more second cluster server nodes associated with the second data center to replicate processing results data to at least one other data center different from the second data center as each processing step of the multiple processing steps associated with the data processing job is completed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, and 2E depict an illustrative event sequence for optimizing data processing across server clusters and data centers using checkpoint-based data replication in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
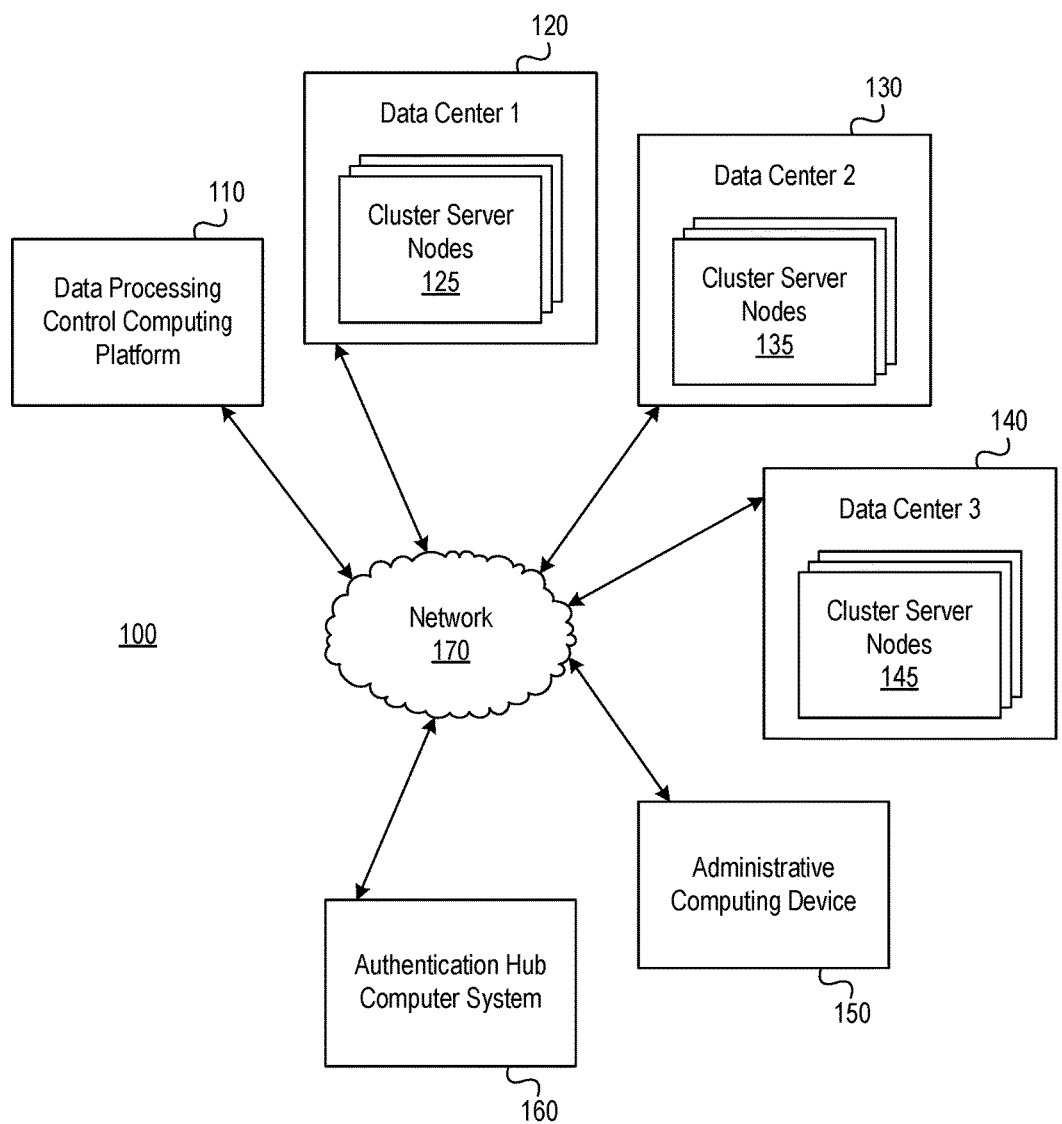
FIGS. 1A and 1B depict an illustrative computing environment for optimizing data processing across server clusters and data centers using checkpoint-based data replication in accordance with one or more example embodiments.
Figure 1B:
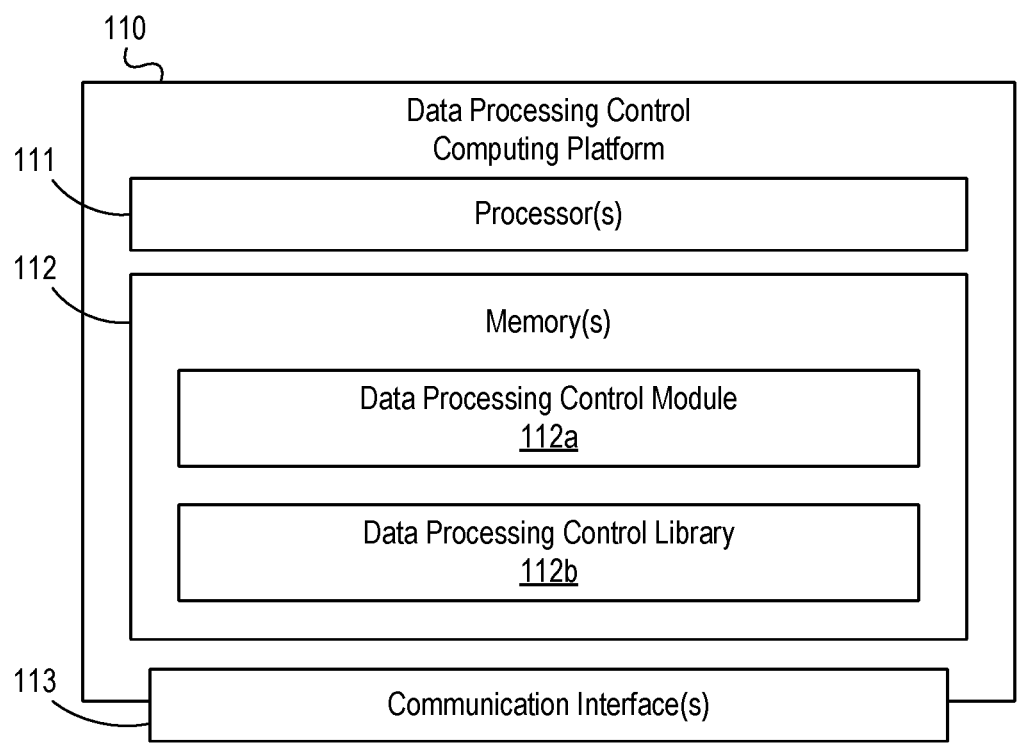

FIGS. 1A and 1B depict an illustrative computing environment for optimizing data processing across server clusters and data centers using checkpoint-based data replication in accordance with one or more example embodiments. Referring to FIG. 1A, computing environment 100 may include one or more data centers, one or more computing platforms, and one or more other computing devices. For example, computing environment 100 may include one or more data centers and one or more computing devices, including computing devices located at or within such data centers and computing devices not located at or within such data centers. For example, computing environment 100 may include a data processing control computing platform 110, a first data center 120, a second data center 130, a third data center 140, an administrative computing device 150, and an authentication hub computer system 160. In addition, data center 120 may include cluster server nodes 125, data center 130 may include cluster server nodes 135, and data center 140 may include cluster server nodes 145.

As illustrated in greater detail below, data processing control computing platform 110 may include one or more computing devices configured to perform one or more of the functions described herein. For example, data processing control computing platform 110 may include one or more computers (e.g., laptop computers, desktop computers, servers, server blades, or the like) configured to perform one or more of the functions described herein, as discussed in greater detail below.

Data center 120, data center 130, and data center 140 may be distinct and physically separate data centers that are operated by and/or otherwise associated with an organization, such as a financial institution. In addition, each of data center 120, data center 130, and data center 140 may house a plurality of server computers and various other computers, network components, and devices. Cluster server nodes 125 may be made up of and/or otherwise include one or more servers and/or server blades, which may be located at data center 120, and which may be monitored and/or controlled by data processing control computing platform 110 and/or one or more other computers included in computing environment 100. Similarly, cluster server nodes 135 may be made up of and/or otherwise include one or more servers and/or server blades, which may be located at data center 130, and which may be monitored and/or controlled by data processing control computing platform 110 and/or one or more other computers included in computing environment 100. In addition, cluster server nodes 145 may be made up of and/or otherwise include one or more servers and/or server blades, which may be located at data center 140, and which may be monitored and/or controlled by data processing control computing platform 110 and/or one or more other computers included in computing environment 100. Each server and/or server blade included in cluster server nodes 125, cluster server nodes 135, and cluster server nodes 145 may include one or more processors, memories, communication interfaces, storage devices, and/or other components.

Administrative computing device 150 may be configured to provide one or more interfaces that allow for configuration and management of one or more other computing devices and/or computer systems included in computing environment 100. Authentication hub computer system 160 may be configured to provide one or more portal interfaces to one or more client devices and/or may be configured to authenticate one or more client devices and/or users of such devices to such portal interfaces. For example, authentication hub computer system 160 may be configured to provide a customer portal, such as an online banking portal, to one or more customers of an organization, such as a financial institution, who may use one or more client computing devices to access the portal and/or who may be authenticated to one or more portal user accounts by authentication hub computer system 160 using various authentication techniques. In some instances, in addition to being configured to provide an online banking portal associated with a financial institution to one or more customers of the financial institution and/or their associated computing devices, authentication hub computer system 160 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

In some instances, one or more of data center 120, data center 130, and data center 140 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating data center 120, data center 130, and data center 140), to connect one or more customers of the organization with one or more customer service representatives of the organization via one or more telephone support sessions, chat support sessions, and/or other client support sessions.

Computing environment 100 also may include one or more networks, which may interconnect one or more of data processing control computing platform 110, data center 120, cluster server nodes 125, data center 130, cluster server nodes 135, data center 140, cluster server nodes 145, administrative computing device 150, and authentication hub computer system 160. For example, computing environment 100 may include network 170, which may include one or more public networks, one or more private networks, and/or one or more sub-networks (e.g., local area networks (LANs), wide area networks (WANs), or the like).

In one or more arrangements, administrative computing device 150 and authentication hub computer system 160 may be any type of computing device capable of receiving a user interface, receiving input via the user interface, and communicating the received input to one or more other computing devices. For example, administrative computing device 150 and authentication hub computer system 160 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, data processing control computing platform 110 may include one or more processors 111, memory 112, and communication interface 113. A data bus may interconnect processor 111, memory 112, and communication interface 113. Communication interface 113 may be a network interface configured to support communication between data processing control computing platform 110 and one or more networks (e.g., network 170 or the like). Memory 112 may include one or more program modules having instructions that when executed by processor 111 cause data processing control computing platform 110 to perform one or more functions described herein and/or one or more libraries that may store and/or otherwise maintain information which may be used by such program modules and/or processor 111. In some instances, the one or more program modules and/or databases may be stored by and/or maintained in different memory units of data processing control computing platform 110 and/or by different computing devices that may form and/or otherwise make up data processing control computing platform 110. For example, memory 112 may have, store, and/or include a data processing control module 112a and a data processing control library 112b. Data processing control module 112a may have instructions that direct and/or cause data processing control computing platform 110 to optimize data processing across server clusters and data centers using checkpoint-based data replication, as discussed in greater detail below. Data processing control library 112b may store information used by data processing control module 112a and/or data processing control computing platform 110 in optimizing data processing across server clusters and data centers using checkpoint-based data replication and/or in performing other functions.

Figure 2A:
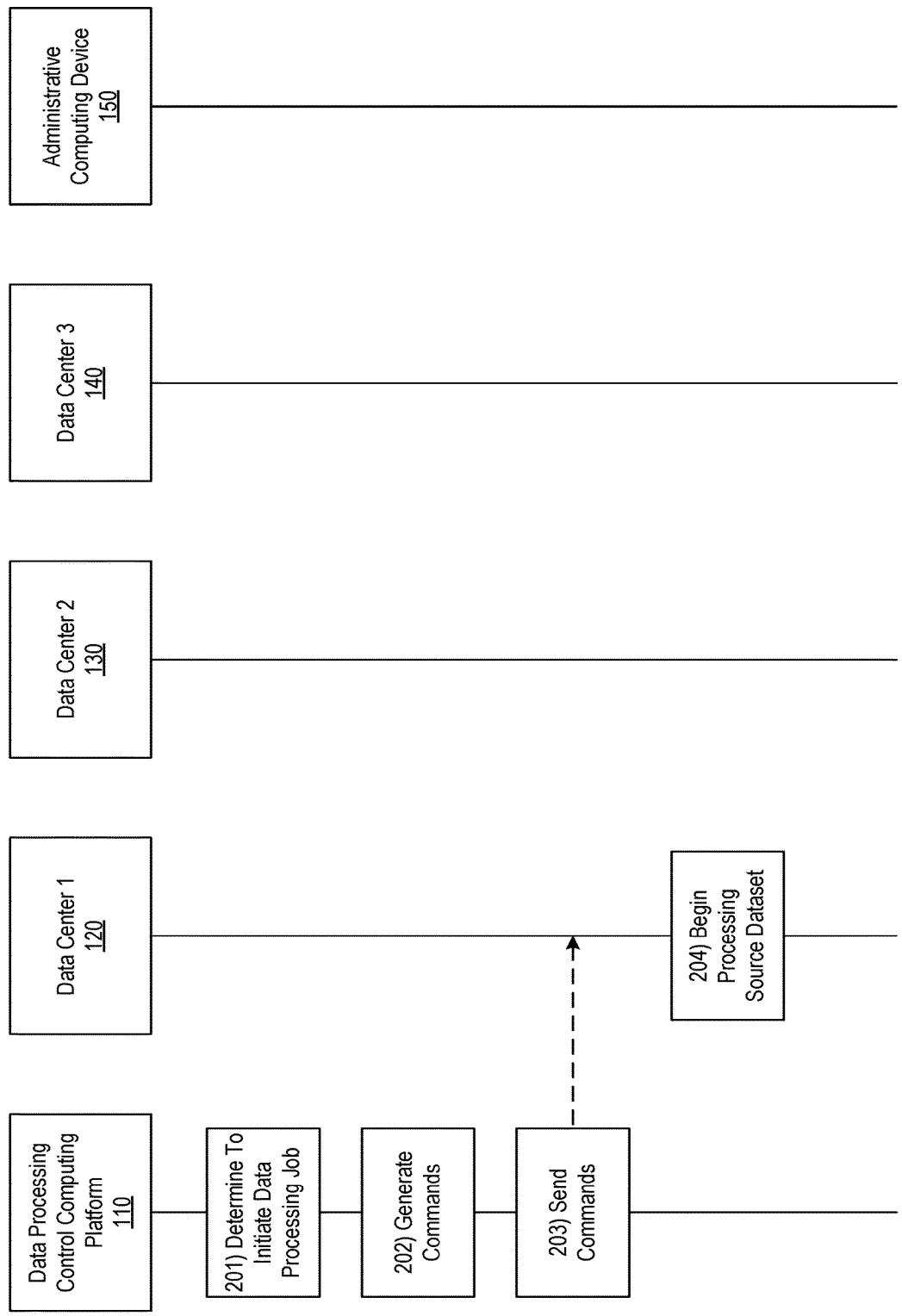

FIGS. 2A, 2B, 2C, 2D, and 2E depict an illustrative event sequence for optimizing data processing across server clusters and data centers using checkpoint-based data replication in accordance with one or more example embodiments. Referring to FIG. 2A, at step 201, data processing control computing platform 110 may determine to initiate a data processing job. For example, at step 201, data processing control computing platform 110 may determine to initiate a data processing job associated with identifying one or more features of a source dataset, and the data processing job may include multiple processing steps. The source dataset may, for instance, include statistics and/or other information obtained from another computer system, such as login statistics and/or other authentication information obtained from authentication hub computer system 160. In addition, the data processing job may include multiple processing steps, and each processing step may correspond to identifying different features of the source dataset, such as different features of the login statistics and/or other authentication information obtained from authentication hub computer system 160, as discussed in greater detail below. In some instances, data processing control computing platform 110 may determine to initiate the data processing job based on user input, based on receiving a script, and/or based on detecting other conditions, as also discussed in greater detail below.

Figure 3:
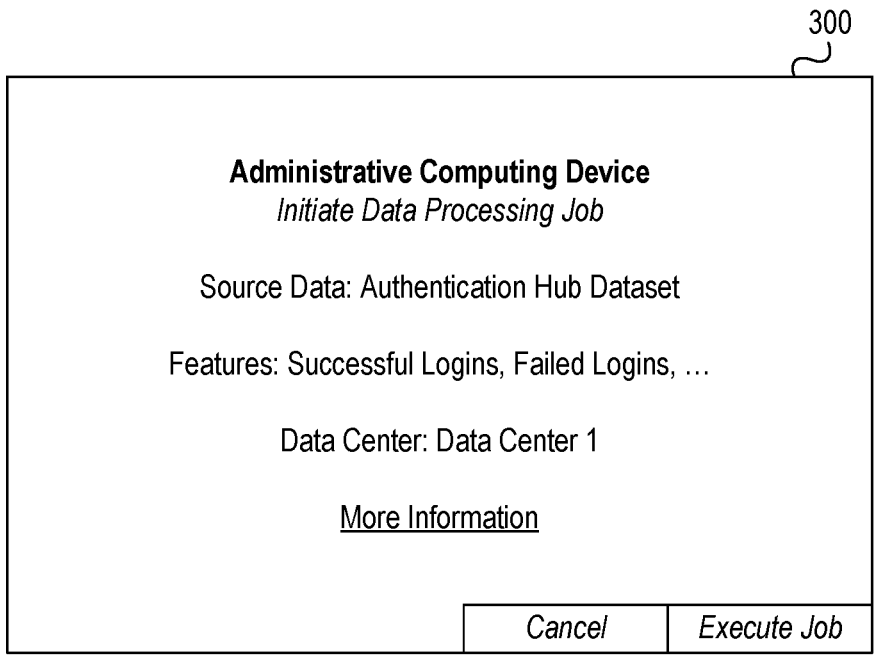
FIGS. 3 and 4 depict example graphical user interfaces for optimizing data processing across server clusters and data centers using checkpoint-based data replication in accordance with one or more example embodiments.

In some embodiments, determining to initiate the data processing job may include determining to initiate the data processing job based on receiving user input requesting to initiate the data processing job. For example, in determining to initiate the data processing job (e.g., at step 201), data processing control computing platform 110 may determine to initiate the data processing job based on receiving user input requesting to initiate the data processing job. In some instances, data processing control computing platform 110 may receive user input requesting to initiate the data processing job itself or from another computing device, such as administrative computing device 150. Additionally or alternatively, the user input requesting to initiate the data processing job may be received via a graphical user interface generated and/or presented by data processing control computing platform 110 and/or administrative computing device 150. For example, in determining to initiate the data processing job and/or in receiving user input requesting to initiate the data processing job, data processing control computing platform 110 may direct and/or otherwise cause a computing device, such as administrative computing device 150, to display and/or otherwise present a graphical user interface similar to graphical user interface 300, which is illustrated in FIG. 3. As seen in FIG. 3, graphical user interface 300 may include user-selectable control elements identifying a source dataset for the processing job, one or more features to be identified during the processing job, a data center at which the processing job should be performed, and/or other information.

In some embodiments, determining to initiate the data processing job may include determining to initiate the data processing job based on receiving, via the communication interface, from an administrative computing device, a script defining the data processing job. For example, in determining to initiate the data processing job (e.g., at step 201), data processing control computing platform 110 may determine to initiate the data processing job based on receiving, via the communication interface (e.g., communication interface 113), from an administrative computing device (e.g., administrative computing device 150), a script defining the data processing job. The script (which may, e.g., be received by data processing control computing platform 110 at step 201) defining the data processing job may, for instance, specify and/or otherwise define a source dataset for the processing job, one or more features to be identified during the processing job, a data center at which the processing job should be performed, and/or other parameters of the processing job.

At step 202, data processing control computing platform 110 may generate one or more commands (e.g., directing one or more servers and/or data centers to execute the data processing job). For example, at step 202, based on determining to initiate the data processing job, data processing control computing platform 110 may generate one or more first commands directing one or more first cluster server nodes (e.g., cluster server nodes 125) associated with a first data center (e.g., data center 120) to execute the multiple processing steps associated with the data processing job to identify the one or more features of the source dataset. The one or more first commands may, for instance, direct the one or more first cluster server nodes (e.g., cluster server nodes 125) associated with the first data center (e.g., data center 120) to transform and/or otherwise process information included in the source dataset to produce information identifying the one or more features associated with the data processing job. In addition, the one or more first commands (which may, e.g., be generated by data processing control computing platform 110) may further direct the one or more first cluster server nodes (e.g., cluster server nodes 125) associated with the first data center (e.g., data center 120) to update a checkpoint table as each processing step of the multiple processing steps associated with the data processing job is completed. Additionally, the one or more first commands (which may, e.g., be generated by data processing control computing platform 110) may further direct the one or more first cluster server nodes (e.g., cluster server nodes 125) associated with the first data center (e.g., data center 120) to replicate processing results data to at least one other data center (e.g., data center 130, data center 140) different from the first data center (e.g., data center 120) as each processing step of the multiple processing steps associated with the data processing job is completed. For instance, the checkpoint table may be maintained at data processing control computing platform 110 and/or at each cluster server node (e.g., each cluster server node of cluster server nodes 125, cluster server nodes 135, and/or cluster server nodes 145) at each data center (e.g., data center 120, data center 130, and/or data center 140). Additionally or alternatively, the checkpoint table may be replicated across all server nodes (e.g., any and/or all cluster server nodes of cluster server nodes 125, cluster server nodes 135, and/or cluster server nodes 145) associated with the data processing job and/or included in computing environment 100.

As illustrated in greater detail below, by directing the use of the checkpoint table and/or the replication of the processing results data across different cluster server nodes (e.g., cluster server nodes 125, cluster server nodes 135, cluster server nodes 145) at different data centers (e.g., data center 120, data center 130, data center 140), data processing control computing platform 110 may provide a failover capability such that a large data processing job, if interrupted at one data center, can be resumed at another data center based on the checkpoint table and the replicated data. This approach provides a number of technical advantages, including more efficient usage of computing resources and time, particularly in instances where a data processing job is interrupted at one data center and must be resumed at another data center, because instead of having to be restarted from the beginning of the job, the job can be resumed from the last replication point identified in the checkpoint table where the other data center left off processing.

At step 203, data processing control computing platform 110 may send the one or more commands generated at step 202 to data center 120 (e.g., directing cluster server nodes 125 at data center 120 to begin executing the steps of the data processing job, updating the checkpoint table and replicating data to data center 130, data center 140, and/or one or more other data centers). For example, at step 203, data processing control computing platform 110 may send, via the communication interface (e.g., communication interface 113), to the one or more first cluster server nodes (e.g., cluster server nodes 125) associated with the first data center (e.g., data center 120), the one or more first commands (which may, e.g., have been generated by data processing control computing platform 110 at step 202).

In some embodiments, the processing results data may be determined by the one or more first cluster server nodes associated with the first data center during execution of each processing step of the multiple processing steps associated with the data processing job, and the processing results data may identify at least one feature of the source dataset as determined by the one or more first cluster server nodes associated with the first data center. For example, the processing results data (which may, e.g., be replicated by data center 120 and/or cluster server nodes 125 to data center 130, data center 140, and/or the like based on the one or more commands generated by data processing control computing platform 110 and sent to data center 120 by data processing control computing platform 110) may be determined by the one or more first cluster server nodes (e.g., cluster server nodes 125) associated with the first data center (e.g., data center 120) during execution of each processing step of the multiple processing steps associated with the data processing job. In addition, the processing results data (which may, e.g., be replicated by data center 120 and/or cluster server nodes 125 to data center 130, data center 140, and/or the like based on the one or more commands generated by data processing control computing platform 110 and sent to data center 120 by data processing control computing platform 110) may, for example, identify at least one feature of the source dataset as determined by the one or more first cluster server nodes (e.g., cluster server nodes 125) associated with the first data center (e.g., data center 120). For instance, the cluster server nodes (e.g., cluster server nodes 125) may determine different features of the source dataset during execution of different processing steps of the data processing job. For example, the source dataset may include raw authentication data and/or statistics received from authentication hub computer system 160, and the cluster server nodes (e.g., cluster server nodes 125) may determine different features of the raw authentication data and/or statistics received from authentication hub computer system 160, such as the total number of failed logins, patterns in the failed logins (e.g., patterns and/or trends in network address, location, and/or the like for failed login events), the total number of successful logins, patterns in the successful logins (e.g., patterns and/or trends in network address, location, and/or the like for successful login events), the total number of security challenges, patterns in the security challenges (e.g., patterns and/or trends in network address, location, and/or the like for challenge question events, one-time passcode challenge events, new device challenge events, and/or other security challenge events), and/or the like.

In some embodiments, the checkpoint table also may be replicated with the processing results data to the at least one other data center different from the first data center as each processing step of the multiple processing steps associated with the data processing job is completed, and the checkpoint table may indicate which processing steps of the multiple processing steps associated with the data processing job have been completed. For example, the checkpoint table (which may, e.g., be updated by data center 120 and/or cluster server nodes 125 as each processing step of the multiple processing steps associated with the data processing job is completed based on the one or more commands generated by data processing control computing platform 110 and sent to data center 120 by data processing control computing platform 110) also may be replicated with the processing results data to the at least one other data center (e.g., data center 130, data center 140) different from the first data center (e.g., data center 120) as each processing step of the multiple processing steps associated with the data processing job is completed. In addition, the checkpoint table (which may, e.g., be updated by data center 120 and/or cluster server nodes 125 as each processing step of the multiple processing steps associated with the data processing job is completed based on the one or more commands generated by data processing control computing platform 110 and sent to data center 120 by data processing control computing platform 110) may indicate which processing steps of the multiple processing steps associated with the data processing job have been completed. For instance, the checkpoint table (which may, e.g., be updated by data center 120 and/or cluster server nodes 125 as each processing step of the multiple processing steps associated with the data processing job is completed based on the one or more commands generated by data processing control computing platform 110 and sent to data center 120 by data processing control computing platform 110) may include status information identifying a current status (e.g., Pending, In-Progress, Completed, Failed, and/or the like) of each step of the multiple processing steps associated with the data processing job.

At step 204, data center 120 may begin processing the source dataset. For example, data center 120 and/or cluster server nodes 125 may begin processing the source dataset to identify features of the source dataset based on the one or more commands generated by data processing control computing platform 110 and sent to data center 120 by data processing control computing platform 110.

Figure 2B:
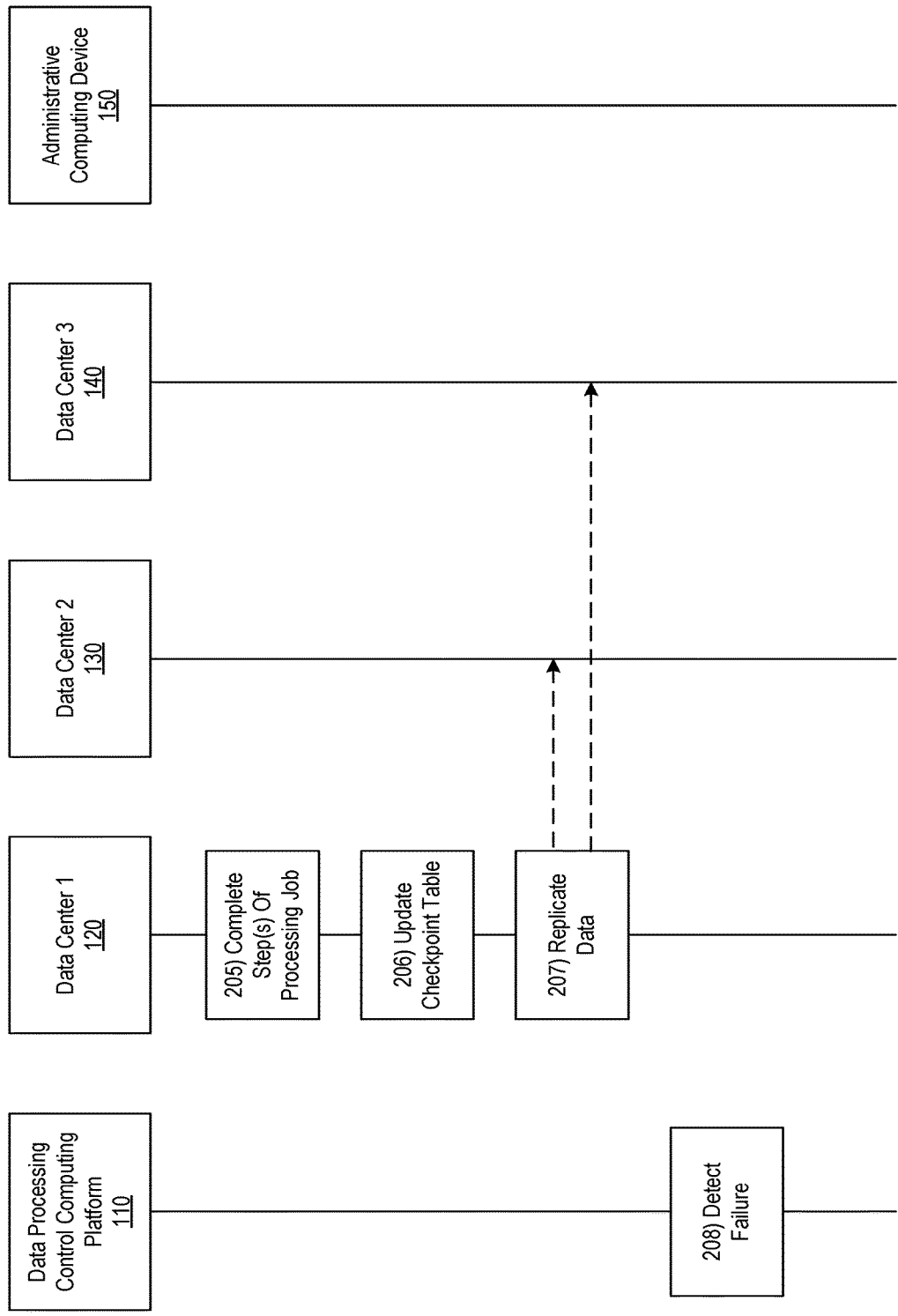

Referring to FIG. 2B, at step 205, data center 120 and/or cluster server nodes 125 may complete one or more steps of the data processing job. At step 206, data center 120 and/or cluster server nodes 125 may update the checkpoint table based on completing the one or more steps of the data processing job. Additionally or alternatively, data center 120 and/or cluster server nodes 125 may replicate the updated checkpoint table to one or more other data centers (e.g., data center 130, data center 140). At step 207, data center 120 and/or cluster server nodes 125 may replicate data to one or more other data centers (e.g., data center 130, data center 140). For example, at step 207, data center 120 and/or cluster server nodes 125 may replicate processing results data and/or other data to the one or more other data centers (e.g., data center 130, data center 140). Additionally or alternatively, data center 120 and/or cluster server nodes 125 may replicate the updated checkpoint table to the one or more other data centers (e.g., data center 130, data center 140) if, for instance, the updated checkpoint table was not already replicated to the one or more other data centers (e.g., data center 130, data center 140). In some instances, data center 120 and/or cluster server nodes 125 updating the checkpoint table at step 206 may trigger the replicating of the processing results data and/or the other data (which may, e.g., include the checkpoint table itself) to the one or more other data centers (e.g., data center 130, data center 140) at step 207.

At step 208, data processing control computing platform 110 may detect a failure associated with the data processing job. For example, in detecting the failure associated with the data processing job, data processing control computing platform 110 may detect that the data processing job has stopped or been halted, that the data center (e.g., data center 120) processing the data processing job has lost connectivity or failed, or that some other error or failure has occurred with respect to the data processing job.

In some embodiments, detecting the failure associated with the data processing job may include detecting that the data processing job has stopped prior to completion. For example, in detecting the failure associated with the data processing job (e.g., at step 208), data processing control computing platform 110 may detect that the data processing job has stopped prior to completion. For instance, data processing control computing platform 110 may detect that the data processing job has been interrupted or stalled, potentially due to a programming error, otherwise has been stopped before all of the steps associated with the data processing job were completed.

In some embodiments, detecting the failure associated with the data processing job may include detecting that the first data center has failed. For example, in detecting the failure associated with the data processing job (e.g., at step 208), data processing control computing platform 110 may detect that the first data center (e.g., data center 120) has failed. For instance, data processing control computing platform 110 may detect that the first data center (e.g., data center 120) has crashed, lost network connectivity, gone offline, and/or otherwise failed.

Referring to FIG. 2C, at step 209, data processing control computing platform 110 may generate a notification (e.g., responsive to detecting the failure associated with the data processing job at step 208). For example, at step 209, based on detecting the failure associated with the data processing job, data processing control computing platform 110 may generate a notification identifying the failure associated with the data processing job. At step 210, data processing control computing platform 110 may send the notification to administrative computing device 150 and/or one or more other systems and/or devices. For example, at step 210, data processing control computing platform 110 may send, via the communication interface (e.g., communication interface 113), to an administrative computing device (e.g., administrative computing device 150), the notification identifying the failure associated with the data processing job. In some instances, the notification (which may, e.g., be generated by data processing control computing platform 110 and sent by data processing control computing platform 110 to administrative computing device 150) may prompt a user of administrative computing device 150 to restart the data processing job at the same data center (e.g., data center 120) or at a different data center (e.g., data center 130, data center 140), as discussed in greater detail below.

Figure 4:
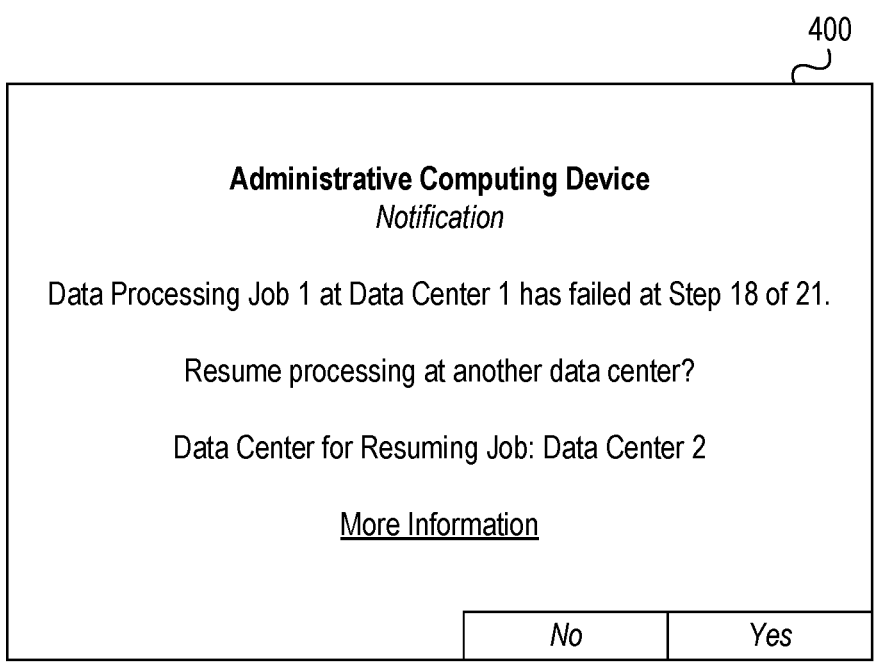

In addition, in some instances, in sending the notification identifying the failure associated with the data processing job at step 210, data processing control computing platform 110 may direct and/or otherwise cause a computing device, such as administrative computing device 150, to display and/or otherwise present a graphical user interface similar to graphical user interface 400, which is illustrated in FIG. 4. As seen in FIG. 4, graphical user interface 400 may include information indicating that the data processing job has failed (e.g., "Data Processing Job 1 at Data Center 1 has failed at Step 18 of 21") and one or more user-selectable control elements prompting the user to resume the data processing job at another data center, include one or more user-selectable control elements identifying and/or allowing the user to modify the source dataset for the processing job, the one or more features to be identified during the processing job, the data center at which the processing job should be resumed, and/or other information.

At step 211, data processing control computing platform 110 may receive a notification response from administrative computing device 150. For example, at step 211, data processing control computing platform 110 may receive, via the communication interface (e.g., communication interface 113), from the administrative computing device (e.g., administrative computing device 150), a response to the notification identifying the failure associated with the data processing job.

At step 212, data processing control computing platform 110 may determine to resume the data processing job (e.g., at a particular checkpoint identified in the checkpoint table). For example, at step 212, data processing control computing platform 110 may determine to resume execution of the data processing job at a second data center (e.g., data center 130) of the at least one other data center (e.g., data center 130, data center 140) different from the first data center (e.g., data center 120). In some instances, data processing control computing platform 110 may determine to resume execution of the data processing job at the second data center (e.g., data center 130) based on the notification response received from administrative computing device 150, and in other instances data processing control computing platform 110 may determine to resume execution of the data processing job at the second data center (e.g., data center 130) automatically based on programming and/or instructions maintained by data processing control computing platform 110, as discussed in greater detail below.

In some embodiments, determining to resume execution of the data processing job at the second data center may include determining to resume the execution of the data processing job at the second data center based on one or more automatic failover criteria. For example, in determining to resume execution of the data processing job at the second data center (e.g., data center 130), data processing control computing platform 110 may determine to resume the execution of the data processing job at the second data center (e.g., data center 130) based on one or more automatic failover criteria. The one or more automatic failover criteria may, for instance, specify circumstances in which data processing control computing platform 110 is able to automatically resume the execution of the data processing job at the second data center (e.g., data center 130).

In some embodiments, determining to resume execution of the data processing job at the second data center may include determining to resume the execution of the data processing job at the second data center based on a response to a notification identifying the failure associated with the data processing job received from an administrative computing device. For example, in determining to resume execution of the data processing job at the second data center (e.g., data center 130), data processing control computing platform 110 may determine to resume the execution of the data processing job at the second data center (e.g., data center 130) based on a response to a notification identifying the failure associated with the data processing job received from an administrative computing device (e.g., administrative computing device 150). For instance, data processing control computing platform 110 may determine to resume the execution of the data processing job at the second data center (e.g., data center 130) based on the notification response received from administrative computing device 150 at step 211.

Figure 2D:
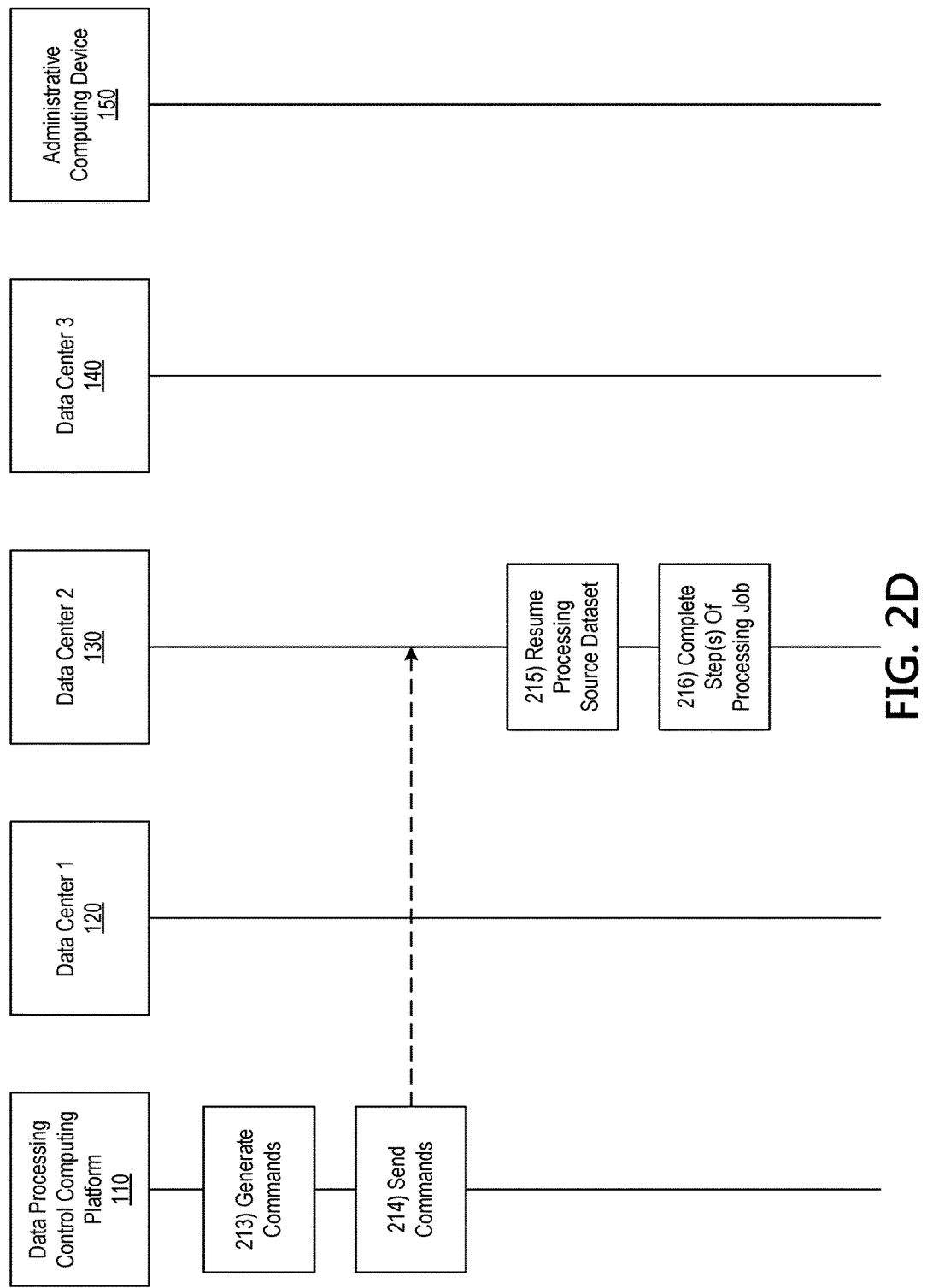

Referring to FIG. 2D, at step 213, data processing control computing platform 110 may generate one or more commands. For instance, data processing control computing platform 110 may generate one or more commands directing data center 130 to resume processing of the data processing job at a particular checkpoint (e.g., based on replicated processed data and/or the replicated checkpoint table), similar to how data processing control computing platform 110 may have generated the one or more commands for data center 120 at step 202. For example, at step 213, based on determining to resume execution of the data processing job at the second data center (e.g., data center 130), data processing control computing platform 110 may generate one or more second commands directing one or more second cluster server nodes (e.g., cluster server nodes 135) associated with the second data center (e.g., data center 130) to execute at least one uncompleted processing step of the multiple processing steps associated with the data processing job based on the checkpoint table and the processing results data replicated from the first data center (e.g., data center 120).

At step 214, data processing control computing platform 110 may send the one or more commands generated at step 213 to data center 130. For example, at step 214, data processing control computing platform 110 may send, via the communication interface (e.g., communication interface 113), to the one or more second cluster server nodes (e.g., cluster server nodes 135) associated with the second data center (e.g., data center 130), the one or more second commands.

In some embodiments, the one or more second commands may further direct the one or more second cluster server nodes associated with the second data center to update the checkpoint table as each processing step of the multiple processing steps associated with the data processing job is completed, and the one or more second commands may further direct the one or more second cluster server nodes associated with the second data center to replicate processing results data to at least one other data center different from the second data center as each processing step of the multiple processing steps associated with the data processing job is completed. For example, the one or more second commands (which may, e.g., be generated by data processing control computing platform 110 at step 213 and/or sent by data processing control computing platform 110 to data center 130 at step 214) may further direct the one or more second cluster server nodes (e.g., cluster server nodes 135) associated with the second data center (e.g., data center 130) to update the checkpoint table as each processing step of the multiple processing steps associated with the data processing job is completed. In addition, the one or more second commands (which may, e.g., be generated by data processing control computing platform 110 at step 213 and/or sent by data processing control computing platform 110 to data center 130 at step 214) may further direct the one or more second cluster server nodes (e.g., cluster server nodes 135) associated with the second data center (e.g., data center 130) to replicate processing results data to at least one other data center (e.g., data center 120, data center 140) different from the second data center (e.g., data center 130) as each processing step of the multiple processing steps associated with the data processing job is completed.

Figure 2E:
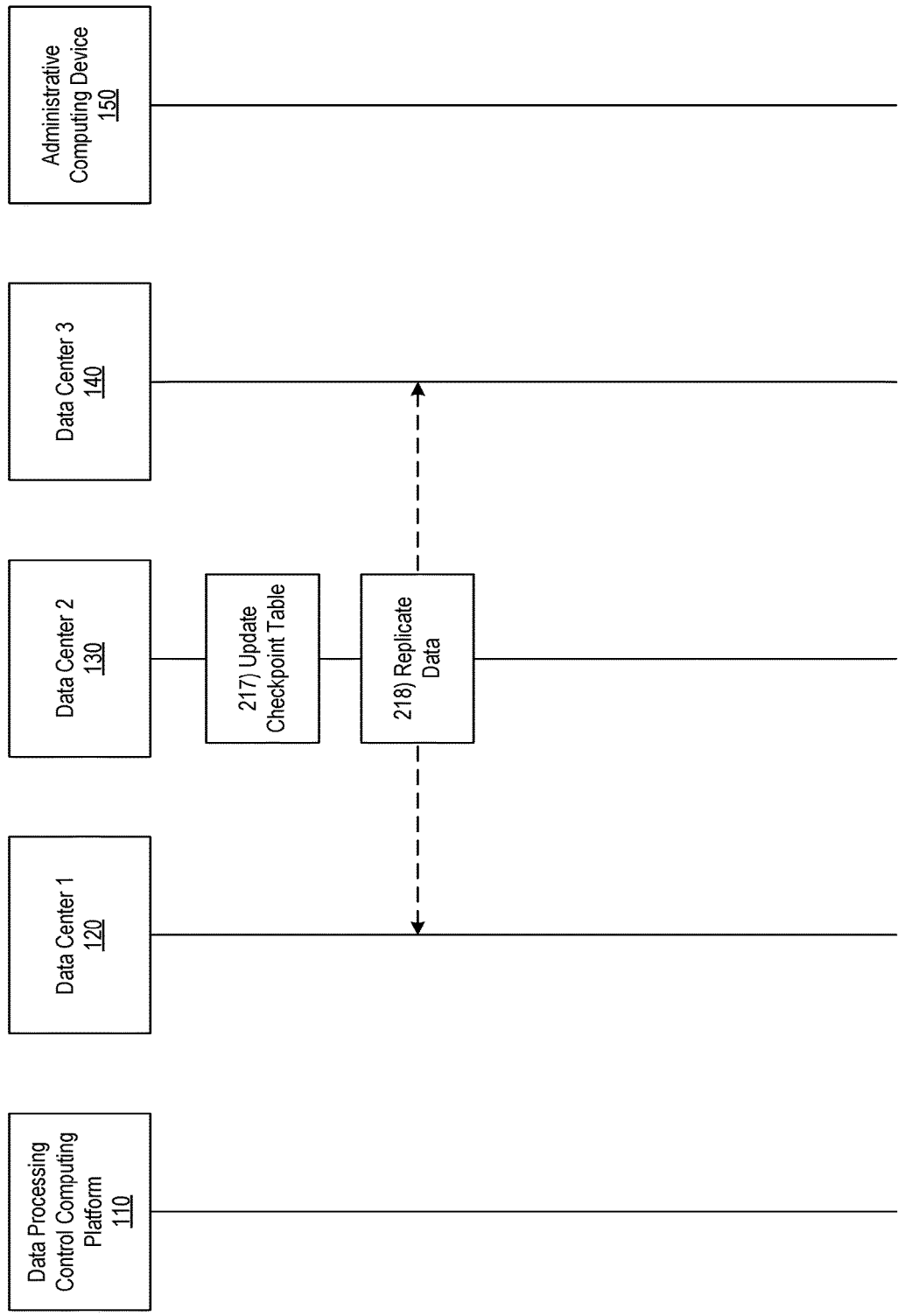

At step 215, data center 130 and/or cluster server nodes 135 may resume processing of the source dataset (e.g., based on the one or more commands received from data processing control computing platform 110 to resume the data processing job). At step 216, data center 130 and/or cluster server nodes 135 may complete one or more processing steps of the data processing job. Referring to FIG. 2E, at step 217, data center 130 and/or cluster server nodes 135 may update the checkpoint table based on completing the one or more processing steps of the data processing job, similar to how data center 120 and/or cluster server nodes 125 updated the checkpoint table above. At step 218, data center 130 and/or cluster server nodes 135 may replicate the processing results data and/or the checkpoint table to the other data centers (e.g., data center 120, data center 140) and/or the other cluster server nodes (e.g., cluster server nodes 125, cluster server nodes 145), similar to how data center 120 and/or cluster server nodes 125 replicated the processing results data and/or the checkpoint table above.

Figure 5:
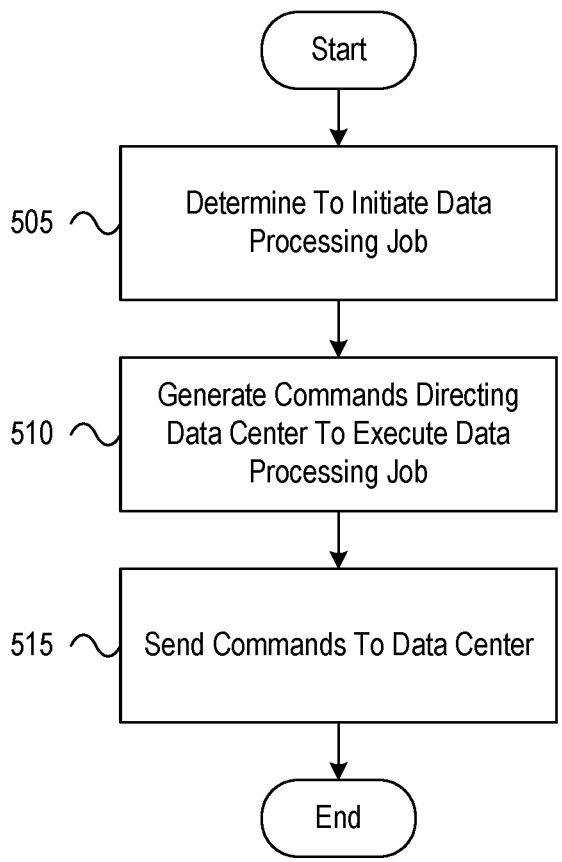
FIG. 5 depicts an illustrative method for optimizing data processing across server clusters and data centers using checkpoint-based data replication in accordance with one or more example embodiments.

FIG. 5 depicts an illustrative method for optimizing data processing across server clusters and data centers using checkpoint-based data replication in accordance with one or more example embodiments. Referring to FIG. 5, at step 505, a computing platform having at least one processor, a communication interface, and a memory storing computer-readable instructions may determine to initiate a data processing job associated with identifying one or more features of a source dataset. In addition, the data processing job may include multiple processing steps. At step 510, based on determining to initiate the data processing job, the computing platform may generate one or more first commands directing one or more first cluster server nodes associated with a first data center to execute the multiple processing steps associated with the data processing job to identify the one or more features of the source dataset. The one or more first commands may further direct the one or more first cluster server nodes associated with the first data center to update a checkpoint table as each processing step of the multiple processing steps associated with the data processing job is completed. In addition, the one or more first commands may further direct the one or more first cluster server nodes associated with the first data center to replicate processing results data to at least one other data center different from the first data center as each processing step of the multiple processing steps associated with the data processing job is completed. At step 515, the computing platform may send, via the communication interface, to the one or more first cluster server nodes associated with the first data center, the one or more first commands.

As illustrated above, by using the checkpoint table and/or replicating the processing results data across different cluster server nodes (e.g., cluster server nodes 125, cluster server nodes 135, cluster server nodes 145) at different data centers (e.g., data center 120, data center 130, data center 140), one or more aspects of the disclosure (which may, e.g., be implemented by data processing control computing platform 110) may provide a failover capability such that a large data processing job, if interrupted at one data center, can be resumed at another data center based on the checkpoint table and the replicated data. This approach provides a number of technical advantages, including more efficient usage of computing resources and time, particularly in instances where a data processing job is interrupted at one data center and must be resumed at another data center, because instead of having to be restarted from the beginning of the job, the job can be resumed from the last replication point identified in the checkpoint table where the other data center left off processing.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      determine to initiate a data processing job associated with identifying one or more features of a source dataset, the data processing job comprising multiple processing steps;
      based on determining to initiate the data processing job, generate one or more first commands directing one or more first cluster server nodes associated with a first data center to execute the multiple processing steps associated with the data processing job to identify the one or more features of the source dataset, the one or more first commands further directing the one or more first cluster server nodes associated with the first data center to update a checkpoint table as each processing step of the multiple processing steps associated with the data processing job is completed, and the one or more first commands further directing the one or more first cluster server nodes associated with the first data center to replicate processing results data to at least one other data center different from the first data center as each processing step of the multiple processing steps associated with the data processing job is completed; and
      send, via the communication interface, to the one or more first cluster server nodes associated with the first data center, the one or more first commands.

2. The computing platform of claim 1, wherein determining to initiate the data processing job comprises determining to initiate the data processing job based on receiving user input requesting to initiate the data processing job.

3. The computing platform of claim 1, wherein determining to initiate the data processing job comprises determining to initiate the data processing job based on receiving, via the communication interface, from an administrative computing device, a script defining the data processing job.

4. The computing platform of claim 1, wherein the processing results data is determined by the one or more first cluster server nodes associated with the first data center during execution of each processing step of the multiple processing steps associated with the data processing job, and the processing results data identifies at least one feature of the source dataset as determined by the one or more first cluster server nodes associated with the first data center.

5. The computing platform of claim 1, wherein the checkpoint table is also replicated with the processing results data to the at least one other data center different from the first data center as each processing step of the multiple processing steps associated with the data processing job is completed, and the checkpoint table indicates which processing steps of the multiple processing steps associated with the data processing job have been completed.

6. The computing platform of claim 1, wherein the memory stores additional computer-readable instructions that, when executed by the at least one processor, cause the computing platform to:
   detect a failure associated with the data processing job.

7. The computing platform of claim 6, wherein detecting the failure associated with the data processing job comprises detecting that the data processing job has stopped prior to completion.

8. The computing platform of claim 6, wherein detecting the failure associated with the data processing job comprises detecting that the first data center has failed.

9. The computing platform of claim 6, wherein the memory stores additional computer-readable instructions that, when executed by the at least one processor, cause the computing platform to:
   based on detecting the failure associated with the data processing job, generate a notification identifying the failure associated with the data processing job; and
   send, via the communication interface, to an administrative computing device, the notification identifying the failure associated with the data processing job.

10. The computing platform of claim 9, wherein the memory stores additional computer-readable instructions that, when executed by the at least one processor, cause the computing platform to:
    receive, via the communication interface, from the administrative computing device, a response to the notification identifying the failure associated with the data processing job.

11. The computing platform of claim 6, wherein the memory stores additional computer-readable instructions that, when executed by the at least one processor, cause the computing platform to:
    determine to resume execution of the data processing job at a second data center of the at least one other data center different from the first data center.

12. The computing platform of claim 11, wherein determining to resume execution of the data processing job at the second data center comprises determining to resume the execution of the data processing job at the second data center based on one or more automatic failover criteria.

13. The computing platform of claim 11, wherein determining to resume execution of the data processing job at the second data center comprises determining to resume the execution of the data processing job at the second data center based on a response to a notification identifying the failure associated with the data processing job received from an administrative computing device.

14. The computing platform of claim 11, wherein the memory stores additional computer-readable instructions that, when executed by the at least one processor, cause the computing platform to:
    based on determining to resume execution of the data processing job at the second data center, generate one or more second commands directing one or more second cluster server nodes associated with the second data center to execute at least one uncompleted processing step of the multiple processing steps associated with the data processing job based on the checkpoint table and the processing results data replicated from the first data center; and
    send, via the communication interface, to the one or more second cluster server nodes associated with the second data center, the one or more second commands.

15. The computing platform of claim 14, wherein the one or more second commands further direct the one or more second cluster server nodes associated with the second data center to update the checkpoint table as each processing step of the multiple processing steps associated with the data processing job is completed, and the one or more second commands further direct the one or more second cluster server nodes associated with the second data center to replicate processing results data to at least one other data center different from the second data center as each processing step of the multiple processing steps associated with the data processing job is completed.

16. A method, comprising:
    at a computing platform comprising at least one processor, memory, and a communication interface:
        determining, by the at least one processor, to initiate a data processing job associated with identifying one or more features of a source dataset, the data processing job comprising multiple processing steps;
        based on determining to initiate the data processing job, generating, by the at least one processor, one or more first commands directing one or more first cluster server nodes associated with a first data center to execute the multiple processing steps associated with the data processing job to identify the one or more features of the source dataset, the one or more first commands further directing the one or more first cluster server nodes associated with the first data center to update a checkpoint table as each processing step of the multiple processing steps associated with the data processing job is completed, and the one or more first commands further directing the one or more first cluster server nodes associated with the first data center to replicate processing results data to at least one other data center different from the first data center as each processing step of the multiple processing steps associated with the data processing job is completed; and
        sending, by the at least one processor, via the communication interface, to the one or more first cluster server nodes associated with the first data center, the one or more first commands.

17. The method of claim 16, wherein determining to initiate the data processing job comprises determining to initiate the data processing job based on receiving user input requesting to initiate the data processing job.

18. The method of claim 16, wherein determining to initiate the data processing job comprises determining to initiate the data processing job based on receiving, via the communication interface, from an administrative computing device, a script defining the data processing job.

19. The method of claim 16, wherein the processing results data is determined by the one or more first cluster server nodes associated with the first data center during execution of each processing step of the multiple processing steps associated with the data processing job, and the processing results data identifies at least one feature of the source dataset as determined by the one or more first cluster server nodes associated with the first data center.

20. One or more non-transitory computer-readable media storing instructions that, when executed by a computing platform comprising at least one processor, memory, and a communication interface, cause the computing platform to:
    determine to initiate a data processing job associated with identifying one or more features of a source dataset, the data processing job comprising multiple processing steps;
    based on determining to initiate the data processing job, generate one or more first commands directing one or more first cluster server nodes associated with a first data center to execute the multiple processing steps associated with the data processing job to identify the one or more features of the source dataset, the one or more first commands further directing the one or more first cluster server nodes associated with the first data center to update a checkpoint table as each processing step of the multiple processing steps associated with the data processing job is completed, and the one or more first commands further directing the one or more first cluster server nodes associated with the first data center to replicate processing results data to at least one other data center different from the first data center as each processing step of the multiple processing steps associated with the data processing job is completed; and
    send, via the communication interface, to the one or more first cluster server nodes associated with the first data center, the one or more first commands.

* * * * *